United States Patent
Anand et al.

(10) Patent No.: US 9,929,800 B2
(45) Date of Patent: Mar. 27, 2018

(54) SYSTEM AND METHOD FOR ADAPTIVE TRAFFIC ENGINEERING BASED ON PREDICTED TRAFFIC DEMAND

(71) Applicant: Infinera Corporation, Annapolis Junction, MD (US)

(72) Inventors: Madhukar Anand, Fremont, CA (US); Ramesh Iyer, Freemont, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 15/093,623

(22) Filed: Apr. 7, 2016

(65) Prior Publication Data

US 2017/0294961 A1 Oct. 12, 2017

(51) Int. Cl.
*H04B 10/27* (2013.01)
*H04B 10/079* (2013.01)
*H04J 14/02* (2006.01)

(52) U.S. Cl.
CPC ......... *H04B 10/0795* (2013.01); *H04B 10/27* (2013.01); *H04J 14/021* (2013.01)

(58) Field of Classification Search
CPC combination set(s) only.
See application file for complete search history.

(56) References Cited

U.S. PATENT DOCUMENTS

| 2006/0153496 | A1* | 7/2006 | Tanobe | H04J 14/0227 385/24 |
| 2010/0246396 | A1* | 9/2010 | Licardie | H04L 47/10 370/232 |
| 2013/0223794 | A1* | 8/2013 | Boduch | H04J 14/0204 385/24 |
| 2016/0127811 | A1* | 5/2016 | Amokrane | H04L 43/0882 398/58 |
| 2016/0182146 | A1* | 6/2016 | Schmidtke et al. | H04B 10/038 398/2 |
| 2016/0234099 | A1* | 8/2016 | Jiao | H04L 45/02 |

OTHER PUBLICATIONS

"Providing Public Intradomain Traffic Matrices to the Research Community," Steve Uhlig, Bruno Quoitin, Jean Lepropre, and Simon Balon, ACM Sigcomm Computer Communication Review (CCR), vol. 36, No. 1, pp. 83-86, Jan. 2006.

* cited by examiner

*Primary Examiner* — David Payne
*Assistant Examiner* — Omar S Ismail
(74) *Attorney, Agent, or Firm* — David L. Soltz

(57) ABSTRACT

Systems and methods for adaptive and automated traffic engineering of data transport services may include learning the demand between devices and data paths based on application workloads, prediction of traffic demand and paths based on the workload history, provisioning and management of data paths (i.e. network links) based on the predicted demand, and real-time monitoring and data flow adaptation. Systems and methods for adaptive and automated traffic engineering of data transport services may also include learning the variation of traffic (data flow in the network) on various links (data paths) of the network topology using historical data (e.g. a minute, an hour, a day, or a week of data), predicting the data flow pattern for a time interval, and provisioning the services to steer data to meet the application requirements and other network wide goals (e.g., load balancing).

8 Claims, 7 Drawing Sheets

13

| 413-A | 413-B | 413-U | 413-U |

417

| preamble | SFD | Destination MAC Address | Source MAC Address | Ethernet Type | Payload | FCS |

FIG. 2B

SYSTEM AND METHOD FOR ADAPTIVE TRAFFIC ENGINEERING BASED ON PREDICTED TRAFFIC DEMAND

FIELD OF DISCLOSURE

This disclosure relates generally to packet optical communication networks and more specifically, but not exclusively, to adapting data demands based on predicted demands in packet optical communication networks.

BACKGROUND

Software defined networking (SDN) is an approach to using open protocols, such as OpenFlow, to apply globally aware software control at the edges of the network to access network switches and routers that typically would use closed and proprietary firmware. In the world of software-defined networking, the focus has been on the data center. SDN in the data center has enabled integration with automated systems, allowing enterprises to build virtual networks, provide micro-segmentation, and integrate service chaining. That functionality has demonstrated SDN's value and brings networking a step closer to the automated world enjoyed by virtualization professionals for many years.

However, the data center is not the only part of networking that could use a software-defined hand. Enterprise wide area networks (WANs) are sources of cost and complexity. Stitching together remote offices via a provider's MPLS network is highly functional—with L2 or L3 connectivity options and guaranteed privacy and quality of service—but also expensive. Broadband options lack the rich functionality of a provider's MPLS cloud, but they grant much more bandwidth for the money spent.

The emergence of Software Defined Networking-Wide Area Network (SDN-WAN) technologies is creating a host of new features on data transport services such as the ability to redirect and re-route services dynamically and more flexible traffic engineering. Much of the industry effort in this area, thus far, has been focused on provisioning of these services using SDN technologies. While this helps in simplifying management and programmatic provisioning of services, the traffic engineering approaches used are "static", in that, the paths are determined and provisioned at initialization, and do not change based on actual traffic. This leads to operational inefficiencies in the network, because the traffic dynamicity can be quite high. Typically, to provision statically would mean accounting for the worst-case scenario which leads to over-provisioning of traffic engineering links. In addition, current approaches provide no direct feedback from the observed traffic back to the traffic engineering application, and therefore, no way to account for changing traffic patterns in provisioning of traffic engineering paths. Also, once the paths are provisioned in current approaches, there is no way to change it depending on the actual observed traffic.

Accordingly, there is a need for systems, apparatus, and methods that improve upon conventional approaches including the improved methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method includes: monitoring a plurality of connections in a packet optical network, each of the plurality of connections carrying a corresponding one of a first plurality of packet groups; determining, by a controller, a first amount of packets for a Carrier Ethernet service based on the each of the corresponding one of the first plurality of packet groups, the controller being configured to communicate with and logically connect a first device to a second device using an OpenFlow protocol; determining, based on the first amount of packets, a first plurality of connections between the first device and the second device, the first plurality of connections being among the plurality of connections; establishing a first path between the first device and the second device based on the first plurality of connections; monitoring the plurality of connections, each of the plurality of connections carrying a corresponding one of a second plurality of packet groups; determining, by the controller, a second amount of packets for the Carrier Ethernet service based on the each of the corresponding one of the second plurality of packet groups; determining, based on the second amount of packets, a second plurality of connections between the first device and the second device, the second plurality of connections being among the plurality of connections; and establishing a second path between the first device and the second device based on the second plurality of connections.

In another aspect, an apparatus includes: a first controller configured to communicate with and logically connect a first device to a second device using an OpenFlow protocol and further configured to: monitor a plurality of connections in a packet optical network, each of the plurality of connections carrying a corresponding one of a first plurality of packet groups; determine a first amount of packets for a Carrier Ethernet service based on the each of the corresponding one of the first plurality of packet groups; determine a first plurality of connections between the first device and the second device, the first plurality of connections being among the plurality of connections; establish a first path between the first device and the second device based on the first plurality of connections; monitor the plurality of connections, each of the plurality of connections carrying a corresponding one of a second plurality of packet groups; determine a second amount of packets for the Carrier Ethernet service based on the each of the corresponding one of the second plurality of packet groups; determine, based on the second amount of packets, a second plurality of connections between the first device and the second device, the second plurality of connections being among the plurality of connections; and establish a second path between the first device and the second device based on the second plurality of connections.

In still another aspect, a non-transient computer readable medium containing program instructions for causing a processor to perform a process that includes: monitoring a plurality of connections in a packet optical network, each of the plurality of connections carrying a corresponding one of a first plurality of packet groups; determining a first amount of packets for a Carrier Ethernet service based on the each of the corresponding one of the first plurality of packet groups; determining, based on the first amount of packets, a first plurality of connections between a first device and a second device, the first plurality of connections being among the plurality of connections; establishing a first path between the first device and the second device based on the first plurality of connections; monitoring the plurality of connections, each of the plurality of connections carrying a corresponding one of a second plurality of packet groups; determining a second amount of packets for the Carrier Ethernet service based on the each of the corresponding one of the second plurality of packet groups; determining, based on the second amount of packets, a second plurality of connections between the first device and the second device, the second plurality of connections being among the plurality of connections; and establishing a second path between the first device and the second device based on the second plurality of connections.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIGS. 2A and 2B illustrate an exemplary data transport system between multiple end points with time slots and packets in accordance with some examples of the disclosure.

Figure 1A:
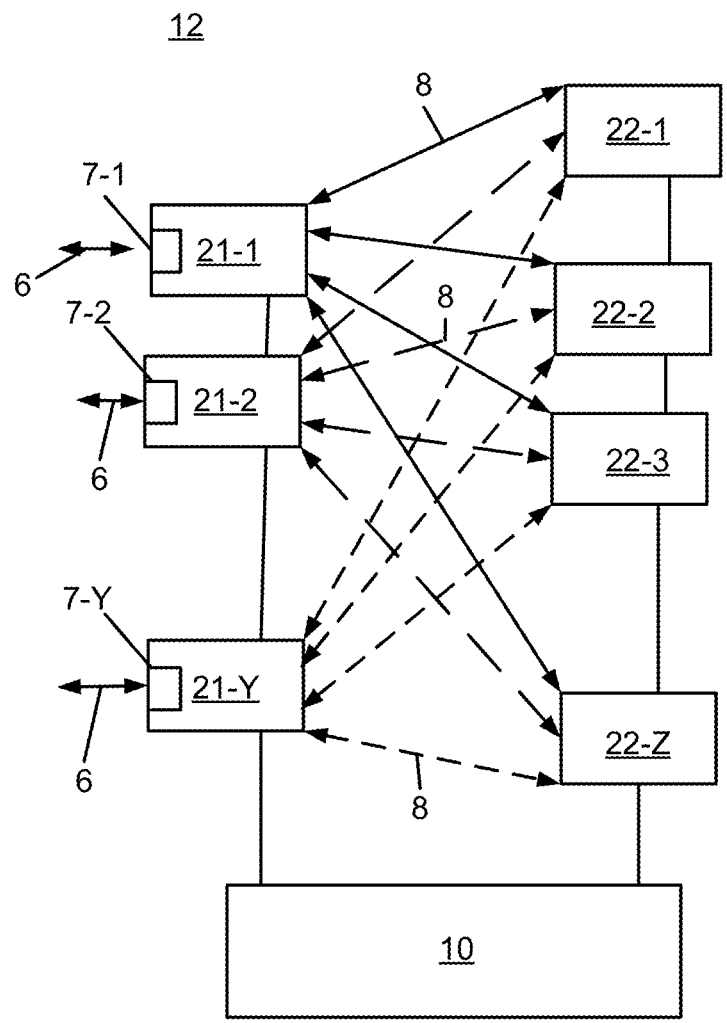
FIG. 1A illustrates an exemplary node of a network in accordance with some examples of the disclosure in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the industry needs, as well as other previously unidentified needs, and mitigate shortcomings of the conventional methods, apparatus, and systems. In some examples, the systems, methods, and apparatus herein determine the amount of packet traffic on a plurality of paths (each path composed of a plurality of network connections) to provision a first path from among the plurality of paths, monitor the packet traffic on the first path, and re-provision a second path to replace the first path based on real time monitoring of the packet traffic on the first path. For example, systems and methods for adaptive and automated traffic engineering of data transport services may include learning the demand between devices, such as routers and switches, and data paths based on application workloads, prediction of traffic demand and paths based on the workload history, provisioning and management of data paths (i.e. network links) based on the predicted demand, and real-time monitoring and data flow adaptation.

FIG. 1A is a diagram of exemplary components of node 12. As shown in FIG. 1A, node 12 may include a controller 10 configurable to control the operation of the node 12 including connection admission (e.g. a software defined networking controller capable of connection admission control), line cards or modules 21-1, 21-2, . . . , 21-Y (referred to collectively as "line modules 21," and individually as "line module 21") (where Y≥1) connected to switching planes 22-1, 22-2, . . . 22-Z (referred to collectively as "switching planes 22," and individually as "switching plane 22") (where Z≥1). Controller 10 may be an application, such as in a SDN, that manages flow control to enable intelligent networking. Controller 10 may be based on protocols, such as OpenFlow, that allow servers to tell switches (e.g. node 12) where to send packets (e.g. packet 417). The controller 10 may logically lie between network devices (e.g. node 12) at one end and applications at the other end. Controller 10 may be configured such that communications between applications and devices (e.g. node 12) have to go through the controller 10. The controller 10 may be configured to uses protocols such as OpenFlow to configure network devices and choose the optimal network path (e.g. first path 460 or second path 470) for application traffic. In effect, the controller 10 may be configured to serve as a sort of operating system for the network 16. By taking the control plane off the network hardware and running it as software instead, the controller 10 may facilitate automated network management and makes it easier to integrate and administer business applications. OpenFlow is a programmable network protocol designed to manage and direct traffic among routers and switches from various vendors. It separates the programming of routers and switches from underlying hardware. OpenFlow may consists of three parts: flow tables installed on switches (e.g. node 12), a controller 10 and a proprietary OpenFlow protocol for the controller 10 to talk securely with switches 12. Flow tables are set up on switches 12. Controller 10 talks to the switches 12 via the OpenFlow protocol and impose policies on flows. The controller 10 could set up paths through the network optimized for specific characteristics, such as speed, fewest number of hops or reduced latency.

While FIG. 1A shows a particular number and arrangement of components, node 12 may include additional, fewer, different, or differently arranged components than those illustrated in FIG. 1A. Also, it may be possible for one of the components of node 12 to perform a function that is described as being performed by another one of the components. Node 12 may configured as a TDM capable optical switch, a router, a reconfigurable optical add/drop multiplexer (ROADM) such as Infinera's DTN-X packet optical transport capable switch, Infinera's EMXP packet-optical transport switch, or similar device configurable to provide Carrier Ethernet services. Node 12 may also be referred to as a device, such as a first device, a second device etc. The line module 21 may be configured as a packet switching module, such as Infinera's PXM module, that supports switching of VLAN tagged packets into ODUFlex or ODU2e circuits. This allows the node 12 to dynamically switch IP/MPLS router traffic over an OTN network using the VLAN label ID to the destination device. This may enable packet switching functionality over an OTN network with maximum network efficiency and scalability by combining the benefits of device bypass with standardized ODU0 level multi-service grooming and switching.

Line module 21 may include hardware components such as one or more ports 7-1, 7-2, . . . , 7-Y, or a combination of hardware and software components, that may provide network interface operations. Line module 21 may receive a multi-wavelength optical signal 6 and/or transmit a multi-wavelength optical signal 6 at the ports 7. A multi-wavelength optical signal 6 may include a number of optical signals of different optical wavelengths. In one implementation, line module 21 may perform retiming, reshaping, regeneration, time division multiplexing, and/or recoding services for each optical wavelength signal 6.

Switching plane 22 may include hardware components, or a combination of hardware and software components, that may provide switching functions to transfer data between line modules 21. In one implementation, switching plane 22 may provide fully non-blocking transfer of data. As to be explained below, switching plane 22 may be programmed to transfer data from a particular input port 6 to a particular output port 6.

As shown in FIG. 1A, each of line modules 21 may connect to each of switching planes 22 with a plurality of connections 8. The connections 8 between line modules 21 and switching planes 22 may be bidirectional. While a single connection 8 is shown between a particular line module 21 and a particular switching plane 22, the connection 8 may include a pair of unidirectional connections (i.e., one in each direction). A connection 8 from a line module 21 to a switching plane 22 will be referred to herein as an "ingress switch link," and a connection 8 from a switching plane 22 to a line module 21 will be referred to as an "egress switch link."

Figure 1B:
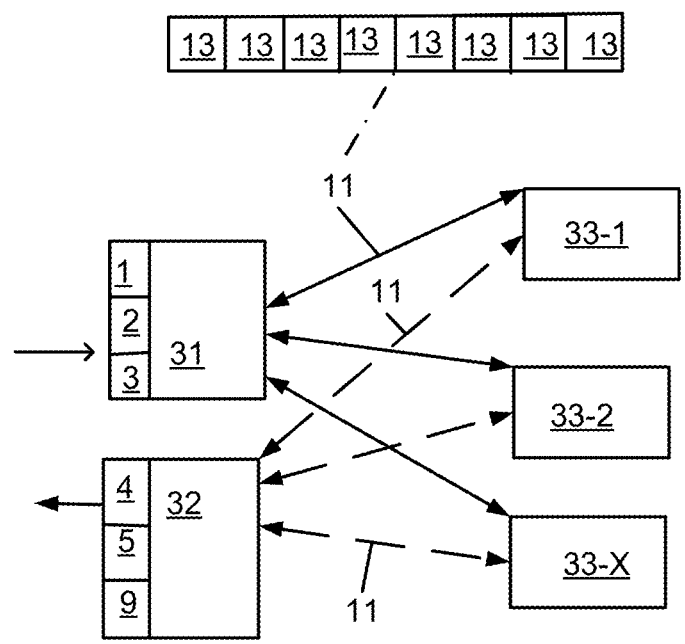
FIG. 1B illustrates an exemplary line module of the node in FIG. 1A in accordance with some examples of the disclosure.

FIG. 1B is a diagram of exemplary components of a line module 21. As shown in FIG. 1B, line module 21 may include a receiver (RX) photonic integrated circuit (PIC) 31 (e.g. a port 7-1), a transmitter (TX) PIC 32 (e.g. a port 7-2), and fabric managers (FMs) 33-1, 33-2, . . . , 33-X (referred to collectively as "FMs 33," and individually as "FM 33") (where X≥1). While FIG. 1B shows a particular number and arrangement of components, line module 21 may include additional, fewer, different, or differently arranged components than those illustrated in FIG. 1B. Also, it may be possible for one of the components of line module 21 to perform a function that is described as being performed by another one of the components.

Receiver PIC 31 may include hardware, or a combination of hardware and software, that may receive a multi-wavelength optical signal 6, separate the multi-wavelength signal 6 into signals of individual wavelengths, and convert the signals 6 to electrical (i.e. digital or analog) signals 11. In one implementation, receiver PIC 31 may include components, such as a photodetector 1, a demultiplexer 2, and/or an optical-to-electrical converter 3. Transmitter PIC 32 may include hardware, or a combination of hardware and software, that may convert signals 11 from digital form into a multi-wavelength optical signal 6, and transmit the multi-wavelength signal 6. In one implementation, transmitter PIC 32 may include components, such as an electrical-to-optical converter 4, a multiplexer 5, and/or a laser 9. As shown in FIG. 1B, receiver PIC 31 and transmitter PIC 32 may connect to each of FMs 33. Receiver PIC 31 may transfer signals 11 to FMs 33. Transmitter PIC 32 may receive signals 11 from FMs 33.

FM 33 may include hardware, or a combination of hardware and software, that may process digital signals 11 for transmission to switching plane 22 or transmitter PIC 32. In one implementation, FM 33 may receive a stream of signals 11 from receiver PIC 31 and divide the stream into time slots 13. In one implementation, each time slot 13 may include the same quantity of bytes (e.g., each time slot 13 may contain an equal amount of bandwidth). In another implementation, each time slot 13 may not include the same quantity of bytes (e.g., at least one time slot may contain a different amount of bandwidth). The stream of signals 11 received by FM 33 may, in one implementation, already be segmented into time slots 13, for example when the multi-wavelength optical signal 6 is received already divided into time slots 13. In this situation, when dividing the signals 11 into time slots 13, FM 33 may identify the time slots 13 based on, for examples, identifiers in the signals 11.

In one implementation, the quantity of time slots 13 may equal the quantity of switches available in switching planes 22. Assume, for example, that there are sixteen switches available in switching planes 22. In this case, FM 33 may divide the signals 11 into sixteen equal time slots 13. FM 33 may send each of the time slots 13 to a different one of the switches. In one implementation, FM 33 may sequentially send each of the time slots 13 in a round robin fashion. In another implementation, FM 33 may send out each of the time slots 13 in another systematic fashion.

Figure 1C:
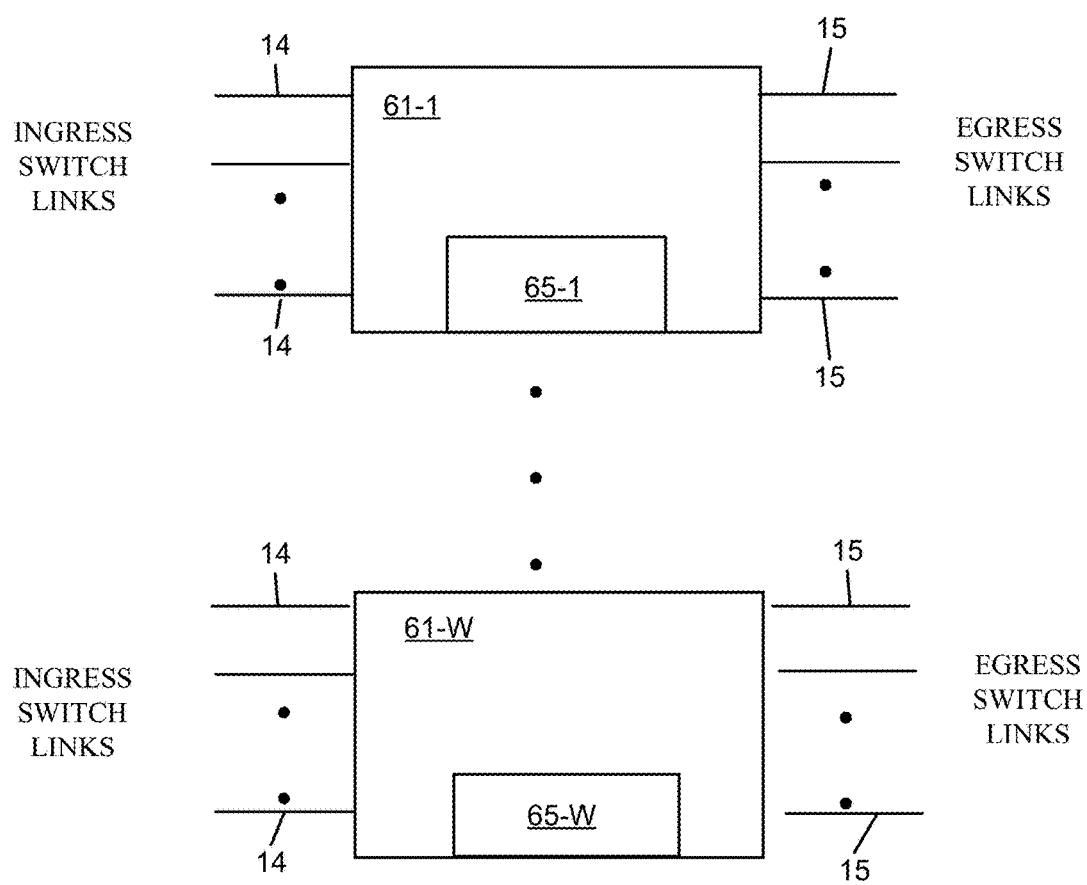
FIG. 1C illustrates an exemplary switch of the node in FIG. 1A in accordance with some examples of the disclosure.

FIG. 1C is a diagram of exemplary components of a switching plane 22. As shown in FIG. 1C, switching plane 22 may include switches 61-1, . . . , 61-W (referred to collectively as "switches 61," and individually as "switch 61") (where W≥1). While FIG. 1C shows a particular number and arrangement of components, switching plane 22 may include additional, fewer, different, or differently arranged components than those illustrated in FIG. 1C. Also, it may be possible for one of the components of switching plane 22 to perform a function that is described as being performed by another one of the components.

Switch 61 may include hardware, or a combination of hardware and software, that may transfer a received time slot 13 on an ingress switch link 14 to a time slot 13 on an egress switch link 15, where the time slot 13 on the ingress switch link 14 may differ from the time slot 13 on the egress switch link 15. Switch 61 may include a set of ingress switch links 14 via which time slots 13 are received, and a set of egress switch links 15 via which time slots 13 are transmitted. Each ingress switch link 14 and egress switch link 15 may connect to a particular FM 33.

Switch 61 may include a configuration database 65. Configuration database 65 may store mapping information that instructs switch 61 on which egress switch link 15 and in what time slot 13 to send a block of data received within a particular time slot 13 on a particular ingress switch link 14 along with information on what port 7 to use. The mapping information may be programmed by an operator of node 12 on a per node 12 basis, and may remain fixed until changed by the operator. Alternatively, the mapping information may be programmed under the control of a network-level routing and signaling algorithm, and may remain fixed until changed by the algorithm. In one implementation, each of switches 61 may store identical mapping information. In other words, each of switches 61 may be programmed to map time slot A on its ingress switch link B to time slot C on its egress switch link D.

In one implementation, configuration database 65 may store the mapping information in the form of a table, such as provided below.

| Egress Switch Link 15 | Egress Time slot 13 | Ingress Switch Link 14 | Ingress Time slot 13 |
|---|---|---|---|
| #8 | #14 | #1 | #10 |

This information may identify an ingress switch link 14 and ingress time slot 13 (e.g., a time slot 13 on the ingress switch link 14) for each egress switch link 15 and egress time slot 13 (e.g., a time slot 13 on the egress switch link 15). As shown, for example, the mapping information may map time slot #10 on ingress switch link #1 to time slot #14 on egress switch link #8.

Figure 1D:
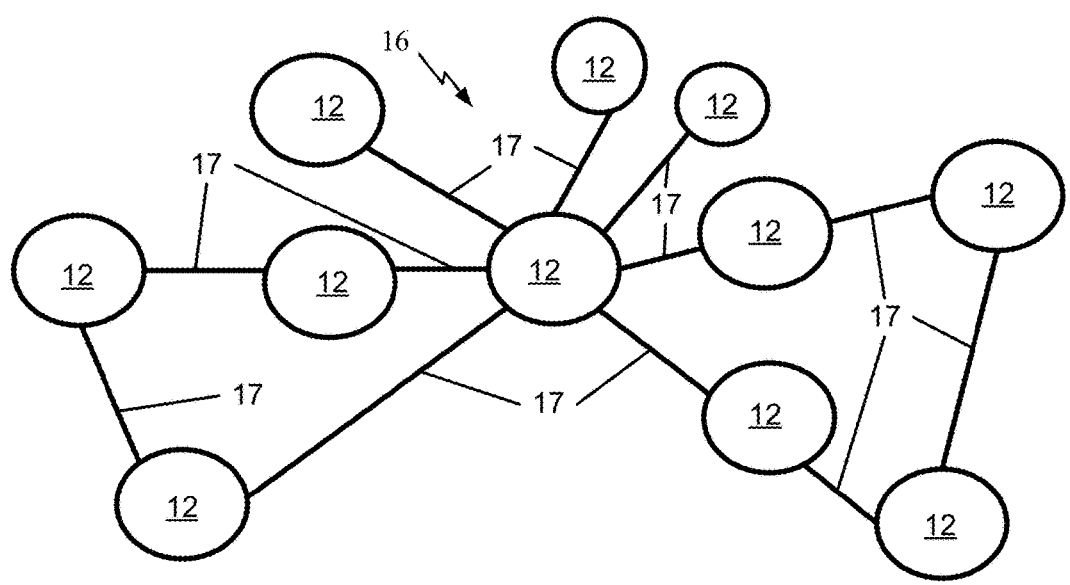
FIG. 1D illustrates an exemplary network configuration of the nodes in FIG. 1A in accordance with some examples of the disclosure.

FIG. 1D illustrates an exemplary network configuration of the nodes in FIG. 1A in accordance with some examples of the disclosure. As shown in FIG. 1D, an optical network 16 may include a plurality of nodes 12 interconnected by a plurality of connections 17. Each of the plurality of connections 17 may be configured to transport a plurality of multi-wavelength optical signals 6 having a plurality of time slots 13 or in another format. Each of the plurality of connections 17 may be, for example, a unidirectional or bi-direction medium such as an optical fiber capable of transporting an optical signal 6 or an electrical signal 11. The following examples describe apparatus and methods for use in conjunction with node 12.

Adaptive data demand management using predicted demand, for example, may be used in conjunction with the node 12 (including the controller 10) described in FIGS. 1A-1D. While the systems and methods may be used in various types of networks that used different transport protocols, the following description will focus on data transport using the Carrier Ethernet protocol defined by the Metro Ethernet Forum by way of example only. A Carrier Ethernet service is defined as a data communication service based on Carrier Ethernet which is delivered to a Carrier Ethernet Subscriber by a Carrier Ethernet Service Provider. Carrier Ethernet services are defined in the MEF service definition specifications MEF 6.2, MEF 51, and MEF 33. Based on the goals of the 5 Carrier Ethernet attributes and the specifications developed by the Metro Ethernet Forum (MEF), Carrier Ethernet: delivers Ethernet frames between different locations in any part of the world at speeds between 1 Mbps and 100 Gbps, differentiates between traffic of multiple end-users running over a single network, runs over multiple types of infrastructure and transport technologies, and coexists with existing Layer 2 and Layer 3 solutions while taking advantage of the huge worldwide Ethernet installed base. Herein bandwidth and time slot may be used interchangeably and a rate of data transport is a rate at which data is transported or to be transported in a network 16—the number of time slots 13 out of the total available time slots 13 on a connection 17 in the network 16. Thus, setting a rate of data transport for a Carrier Ethernet service means allocating a number of time slots 13 (unused time slots) out of the available time slots 13 (used and unused time slots 13 on a connection 17) for use by the Carrier Ethernet service to transport data in the network 16 where the rate is a ratio of allocated time slots (time slots allocated for use by the Carrier Ethernet service) to total number of available time slots on a connection (available time slots are both the used and unused time slots).

Figure 2A:
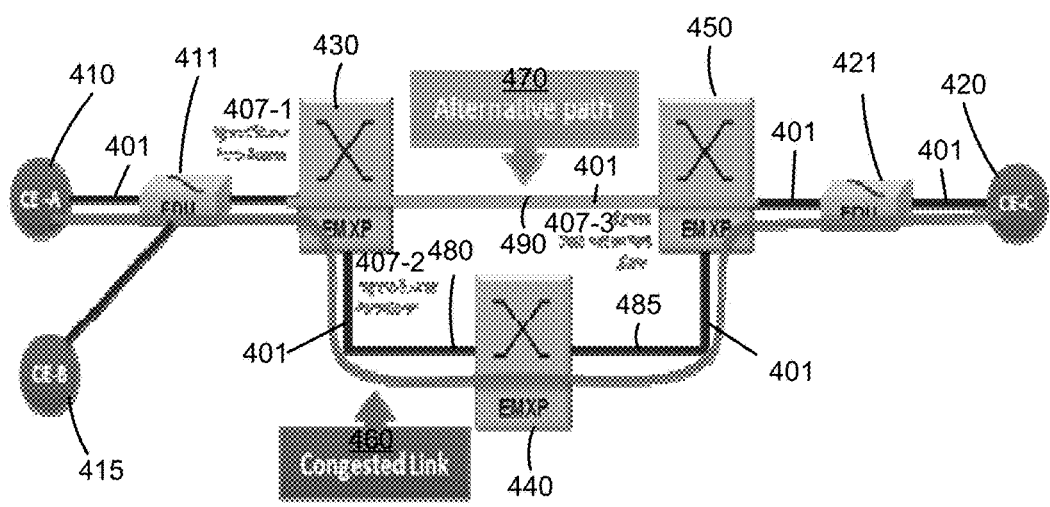

FIGS. 2A and 2B illustrate an exemplary data transport system between multiple end points using time slots and packets in accordance with some examples of the disclosure. As shown in FIG. 2A, a packet optical communication network 400 may include a first client device 410 (e.g. node 12 or similar) connected to a first access device 411 (e.g. node 12) that aggregates data from multiple devices for transport and a third client device 415 connected to the first access device 411 over a plurality of connections 401 (e.g. connection 17) to transport Ethernet packets 417 (shown in FIG. 2B). The first access device 411 may be connected to a second client device 420 (e.g. node 12 or similar) through the network 400 over a first data path 460 or as described below a second data path 470 to enable a first service. The network 400 may include a first network device 430 (e.g. node 12 or similar) connected to the first access device 411. The first network device 430 is interconnected to a second network device 440 (e.g. node 12 or similar) and a third network device 450 (e.g. node 12 or similar). The third network device 450 may be connected to a second access device 421 and the second access device 421 may be connected to the second client device 420. In addition, the third client device 415 may be connected to first access device 411 to enable a second service between the third client device 415 and the second client device 420. The first access device 411 and the second access device 421 are optional and the client devices 410, 415, and 420 may be directly connected to the first network device 430 or the third network device 450 instead. The network 400 may be used to provide adaptive packet 417 demand management including: (1) learning a packet 417 demand between devices on network paths based on application workloads, (2) predicting future packet 417 demand and paths based on the workload history, (3) provisioning and management of network links based on the predicted packet 417 demand, and (4) real-time monitoring of the packet 417 demand and adapting the data paths based on the real-time monitoring. A data path is the series of connections 401 that data packets 417 may follow (and the devices on those links) between end devices such as the first client device 410 and the second client device 420. The connections 401 are the physical (e.g. links such as optical fibers) and logical connections between the devices along the data path. Link and connection are used interchangeably herein.

As shown in FIG. 2A, a first data path 460 of the network 400 may include the first network device 430, a first link 480 connecting the first network device 430 to the second network device 440, the second network device 440, a second link 485 connecting the second network device 440 to the third network device 450, and the third network device 450. A second data path 470 may include the first network device 430, a third link 490 connecting the first network device 430 to the third network device 450, and the third network device 450.

Refer to the FIG. 2A, where there are three network devices 430, 440, and 450 and a service has been established between the first client device 410 and the second client device 420. The service is responsible for carrying packets 417 between the two end points—the first client device 410 and the second client device 420 that has varying packets 417 demands. Another service may be set up between the two end points—the third client device 415 and the second client device 420. With the conventional approach, the network operator (or the paying customer) would decide the amount of packets 417 demand (e.g. bandwidth) that the individual flows would require and provision a primary data path (e.g. the first data path 460) and a backup data path (e.g. the second data path 470) for the data flow between the different end points. If the primary data path fails (e.g. the first link 480 fails), or is congested, the data flow may then take the alternative path. However, the conventional approach does not provide direct feedback from the observed data flow to the traffic engineering application and has no way to account for changing traffic patterns in provisioning of the data paths. Further, once the paths are provisioned, there is no mechanism in the conventional approach to change depending on the actual observed traffic.

The systems and methods describe herein, in contrast to the conventional approach, do not suffer such drawbacks. For example, a system and method for adaptive packets 417 demand may include four steps—(1) learning demand between devices and data paths based on application packets 417 workloads (e.g. a video delivery service between the first client device 410 and the second client device 420), (2) predicting packets 417 demand and data paths based on the workload history, (3) provisioning and management of links and data paths based on the predicted demand, and (4) real-time monitoring and adapting data flows.

One example of automatically learning a demand between devices and data paths based on application workloads is described in the following. On every network device 430-450, a controller (e.g. node 12) monitors the data flow history and learns the packets 417 demand on a per-port basis. First, the network 400 (e.g. a centralized controller or any of network devices 430-450) may automatically learn the packets 417 demand in the network 400. On every network device 430-450 or at least one, the data flow history is monitored to learn the packets 417 demand on a per-port basis such as an ingress source port 407-1 (e.g. port 7-1), an ingress source port 407-2 (e.g. port 7-2), and a egress destination port 407-3 (e.g. port 7-Y). Also illustrated in FIG. 2B is a plurality of time slots 13 (i.e. a traffic stream) with some time slots being used, such as with an Application/Flow-ID 413-A, or a Timestamp 413-B and others unused (time slots 513-U). One exemplary method involves monitoring the following parameters:

Application/Flow-ID 413-A—This is an identifier for a packets 417 flow. We assume Application/Flow-ID 413-A can be used to identify the type of service/traffic (e.g.: video stream, chat, analytics, etc.) using a lookup table the target environment may provide.

Ingress/Source port 407-1—The port (physical or logical) through which the data flow enters the first network device 430.

Ingress/Source port 407-2—The port (physical or logical) through which the data flow leaves the first network device 430.

Egress/Destination port 407-3—The port (physical or logical) through which the data flow enters the third network device 450.

Provisioned bandwidth—This is the provisioned packets 417 demand for bandwidth for the given data flow.

Timestamp 413-B—A discrete value of time for which the data flow parameters are measured.

Complete topology with all the links and the link characteristics (bandwidth, latency, etc.).

Based on the above grouped parameters, the controller 10 will learn cost C(a,b) of forwarding a data packet 417, between a device a and each of its neighbors b, at a particular point of time. This cost will depend on any, or a combination, of the following parameters:

Latency (l)

Reserve bandwidth (bw)

Flow ID (k)

$$C_{(a,b)}(t)=f(l,bw,k) \qquad \text{(Equation 1)}$$

With this information, the controller may now determine how $C_{(a,b)}$ changes with time for a given flow k:

$$F(a,b)(t)=d(C(a,b))/dt \qquad \text{(Equation 2)}$$

Prediction of bandwidth requirement (packets 417 demand) based on the workload history may use equation 3 below. To predict the best data path(s), the controller computes all possible paths between the source a and destination b devices for the flow k, and computes combined cost C(i) for each possible path:

$$C(i)=\Sigma_{i=0}^{n} F(a,b) \qquad \text{(Equation 3)}$$

where n is the number of paths computed

For each path the controller uses a regression function on the curve (or normalized line) plotted by F (equation (2)) to predict/forecast future cost on a range of time. The path that provides the least cost will then be chosen to provision the path between source and destination devices. For example:

1. Let $t_0$ be the start of sampling period of historical data and $t_{max}$ be the end.
2. Let a and b be the source and destination devices for which the controller is computing the data flow path for the flow k.
3. Let n be the total number of possible paths between a and b for the flow k determined by a suitable path feasibility algorithm.
4. The controller is now predicting the value of Cost C(i) i=1, . . . n for the time period $t_0'$ to $t_{max}'$.
5. For i=1 through n//Overall Paths
   a. For t=[$t_0'$ to $t_{max}'$.]

$C(i)$=COMPUTE($F_{(a,b)}(t)$)//Using Equation (2).

6. COMPUTE C using Equation (3) and choose the MIN(C(i)).
7. Provide computed path i to the path provisioning system, such as the controller (e.g. node 12).

In Step 3, the use of a path feasibility algorithm is mentioned to enlist all the feasible paths between two end points. In one example, the algorithm for adaptive packets 417 demand described above runs as an application on top of standard, layer-specific topology discovery and provisioning protocols and services working in conjunction with a network controller. For example, the controller could set up label-switched paths in the network using appropriate control protocols (such as GMPLS), and the path feasibility algorithm would, in that case, simply return the list of all possible label switched paths that can be provisioned subject to the requirements of the flow between the two devices in question. As an example of the above, consider table (1) below that depicts the current cost C(a,b), for all existing flows, computed across all the links in the network topology described by FIGS. 2A and 2B.

TABLE (1)

| Link | Source | Destination | cost per flow | | | | | |
|---|---|---|---|---|---|---|---|---|
| | | | F1 | F2 | F3 | F4 | F5 | F6 |
| 1 | CE-A | CE-B | 0.2653 | — | 0.1654 | — | — | — |
| 2 | CE-A | CE-C | — | 0.9380 | — | 0.8745 | — | — |
| 3 | CE-B | CE-A | 0.3879 | — | 0.2005 | — | — | — |
| 4 | CE-B | CE-C | — | — | — | — | 0.6904 | — |
| 5 | CE-C | CE-A | — | 0.8629 | — | 0.7613 | — | — |
| 6 | CE-C | CE-B | — | — | — | — | 0.5219 | — |
| 7 | CE-A | CE-C | — | — | — | — | — | 0.1453 |
| 8 | CE-C | CE-A | — | — | — | — | — | 0.0890 |

Suppose the system wants to re-provision flow F4 between the first client device 410 (CE-A) and the second client device 420 (CE-C), and suppose the path feasibility System provides the following paths:

Path P1={link 2}
Path P2={link 7}

The above table is re-computed using equation (3).

TABLE (2)

| Link | Source | Destination | cost per flow | | | | | |
|---|---|---|---|---|---|---|---|---|
| | | | F1 | F2 | F3 | F4 | F5 | F6 |
| 1 | CE-A | CE-B | 0.2653 | — | 0.1654 | — | — | — |
| 2 | CE-A | CE-C | — | 0.9380 | — | 0.8745 | — | — |
| 3 | CE-B | CE-A | 0.3879 | — | 0.2005 | — | — | — |
| 4 | CE-B | CE-C | — | — | — | — | 0.6904 | — |
| 5 | CE-C | CE-A | — | 0.8629 | — | 0.7613 | — | — |
| 6 | CE-C | CE-B | — | — | — | — | 0.5219 | — |
| 7 | CE-A | CE-C | — | — | — | 0.2504 | — | 0.1453 |
| 8 | CE-C | CE-A | — | — | — | 0.1096 | — | 0.1050 |

From the above table (2),
C(P1) for F4=0.8745
C(P2) for F4=0.2504

Clearly, P2 provides the lowest cost for flow F4, and the path provisioning system will use P2 to re-provision P4.

Any of network devices 430-450 or a centralized controller (not shown) may provision and manage services based on predicted packets 417 bandwidth demand. The actual provisioning of services with appropriately predicted bandwidth depends on the individual network device implementation (i.e. provisioning by a router may differ from a ROADM, for example). For instance, this could be accomplished with the help of a Software Defined Network (SDN) controller (e.g. a centralized controller) that configures and manages a traditional E-LINE configuration on network devices such as routers. One example may use the REST APIs published by the Infinera Service Mediator to provision appropriate VPN services on the managed devices. Another implementation may use the Infinera OTS framework for provisioning the bandwidth services. In order to prevent a repetitive re-provisioning of the bandwidth and prevent transient traffic losses, the following guidelines may be used by the network devices or SDN controller.

- Ensure make before break approach in provisioning bandwidth.
- Overprovision bandwidth by a small factor (may be user or operator defined) to accommodate for errors in predicted values.
- Quickly normalize the bandwidth to optimum levels using hysteresis. In other words, do not let the predicted bandwidth fluctuate a great deal within a short amount of time.

Any of network devices 430-450 or a centralized controller (not shown) may monitor and adapt to changes in application workloads using a real-time feedback mechanism that loops back all the parameters highlighted in the section describing the learning process. This value is compared with the predicted value for that point of time. If the difference between the actual and predicted values exceed a threshold (which may be derived empirically from historical data), the $F_t$ is recomputed for all possible paths and if needed the best path (not necessarily the current path) is re-provisioned. The algorithm can also suggest alternate paths based on the predicted demand and work with the controller to provision these paths. Thus, the system will account for any change in the network characteristic related to packets 417 demand (e.g. bandwidth) and enable optimal bandwidth utilization. Since the process may be configured to run on an independent compute environment, brute force statistical/machine learning methodologies may be applied without affecting network performance.

Figure 3:
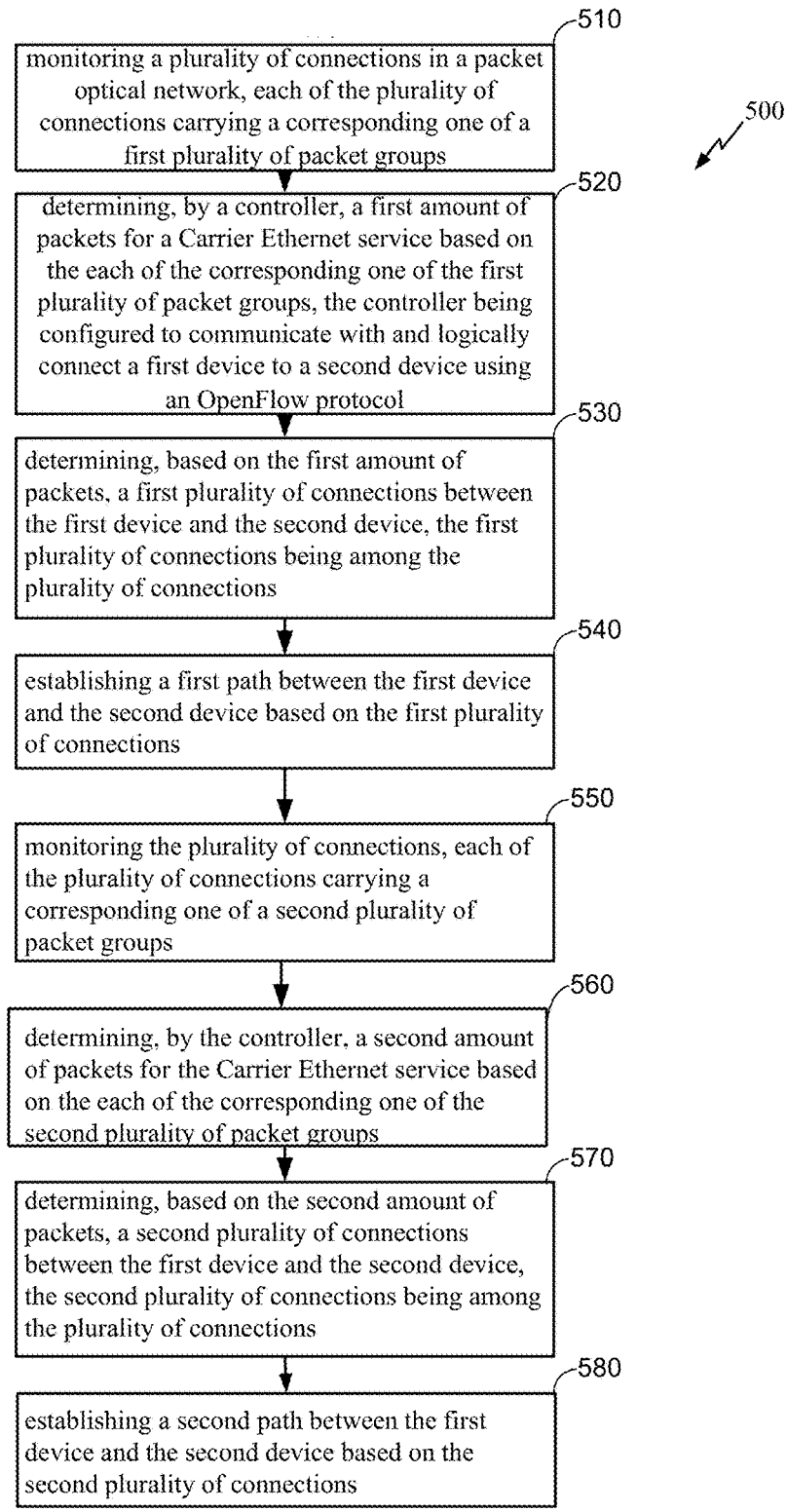
FIG. 3 illustrates an exemplary partial process for adapting data demands based predicted demands in accordance with some examples of the disclosure.

FIG. 3 illustrates an exemplary partial process for adapting packets 417 demands based predicted demands in accordance with some examples of the disclosure. The partial process 500 begins in block 510 with monitoring, by a controller or a network device, an initial packets 417 demand of a plurality of connections in a packet optical network. Next in block 520, the process continues with computing, by the controller or a network device, a first predicted packets 417 demand for each of the plurality of connections based on the monitored initial packets 417 demand. Next in block 530, the process continues with determining, by the controller or a network device, a first data path between a first device and a second device from among the plurality of connections based on the computed first predicted packets 417 demand for each of the plurality of connections. Next in block 540, the process continues with connecting, by the controller or a network device, a first device to a second device using the first data path. Next in block 550, the process continues with monitoring, by the controller or a network device, a current packets 417 demand of the plurality of connections. Next in block 560, the process continues with computing, by the controller or a network device, a second predicted packet 417 demand based on the monitored current packet 417 demand. Next in block 570, the process continues with determining, by the controller or a network device, a second data path between the first device and the second device from among the plurality of connections based on the computed second predicted packets 417 demand for each of the plurality of connections. Next in block 580, the partial process concludes with connecting, by the controller or a network device, the first device to the second device using the second data path.

The exemplary partial process of FIG. 3 may also be viewed as monitoring a plurality of connections in a packet optical network, each of the plurality of connections carrying a corresponding one of a first plurality of packet groups, block 510. Determining, by a controller, a first amount of packets for a Carrier Ethernet service based on the each of the corresponding one of the first plurality of packet groups, block 520. Determining, based on the first amount of packets, a first plurality of connections between a first device and a second device, the first plurality of connections being among the plurality of connections, block 530. Establishing a first path between the first device and the second device based on the first plurality of connections, block 540. Monitoring the plurality of connections, each of the plurality of connections carrying a corresponding one of a second plurality of packet groups, block 550. Determining, by the controller, a second amount of packets for the Carrier Ethernet service based on the each of the corresponding one of the second plurality of packet groups, block 560. Determining, based on the second amount of packets, a second plurality of connections between the first device and the second device, the second plurality of connections being among the plurality of connections, block 570. And establishing a second path between the first device and the second device based on the second plurality of connections, block 580.

The systems and methods for adaptive and automated traffic engineering of packets 417 transport services disclosed herein may lead to (a) better utilization of resources in the network leading to lower CAPEX/OPEX, (b) adapt dynamically to changing traffic patterns and therefore, improve the application response times, and (c) automatically identify and flag anomalous traffic patterns that could ultimately help in identifying network hotspots and respond appropriately.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium (transient and non-transient) having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method comprising:
    monitoring a plurality of connections in a packet optical network, each of the plurality of connections carrying a corresponding one of a first plurality of packet groups;
    determining, by a controller, a first amount of packets based on the each of the corresponding one of the first plurality of packet groups, the controller being configured to communicate with and logically connect a first device to a second device using an OpenFlow protocol;
    determining, based on the first amount of packets, a first plurality of connections between the first device and the second device, the first plurality of connections being among the plurality of connections;
    establishing a first path between the first device and the second device based on the first plurality of connections;
    monitoring the plurality of connections, each of the plurality of connections carrying a corresponding one of a second plurality of packet groups;
    determining, by the controller, a second amount of packets based on the each of the corresponding one of the second plurality of packet groups;
    determining, based on the second amount of packets, a second plurality of connections between the first device and the second device, the second plurality of connections being among the plurality of connections; and
    establishing a second path between the first device and the second device based on the second plurality of connections,
    wherein at least one of the second plurality of packets includes a time stamp that indicates a time at which parameters associated with at least one of the plurality of connections are monitored, the parameters including a type of service, a flow identifier, an ingress port of the first device, an egress port of the first device, and a provisioned bandwidth.

2. The method of claim 1, further comprising monitoring and a latency of each of the plurality of connections.

3. The method of claim 1, wherein at least one of the first device and the second device is configured as a reconfigurable optical add drop multiplexer.

4. An apparatus comprising:
    a first controller configured to communicate with and logically connect a first device to a second device using an OpenFlow protocol and further configured to:

monitor a plurality of connections in a packet optical network, each of the plurality of connections carrying a corresponding one of a first plurality of packet groups;

determine a first amount of packets based on the each of the corresponding one of the first plurality of packet groups;

determine a first plurality of connections between the first device and the second device, the first plurality of connections being among the plurality of connections;

establish a first path between the first device and the second device based on the first plurality of connections;

monitor the plurality of connections, each of the plurality of connections carrying a corresponding one of a second plurality of packet groups;

determine a second amount of packets based on the each of the corresponding one of the second plurality of packet groups;

determine, based on the second amount of packets, a second plurality of connections between the first device and the second device, the second plurality of connections being among the plurality of connections; and establish a second path between the first device and the second device based on the second plurality of connections, wherein at least one of the second plurality of packets includes a time stamp that indicates a time at which parameters associated with at least one of the plurality of connections are monitored, the parameters including a type of service, a flow identifier, an ingress port of the first device, an egress port of the first device, and a provisioned bandwidth.

5. The apparatus of claim 4, wherein the controller is further configured to monitor a latency of each of the plurality of connections.

6. The apparatus of claim 4, wherein at least one of the first device and the second device is configured as a reconfigurable optical add drop multiplexer.

7. A non-transient computer readable medium containing program instructions for causing a processor to perform a process comprising:

monitoring a plurality of connections in a packet optical network, each of the plurality of connections carrying a corresponding one of a first plurality of packet groups;

determining a first amount of packets based on the each of the corresponding one of the first plurality of packet groups;

determining, based on the first amount of packets, a first plurality of connections between a first device and a second device, the first plurality of connections being among the plurality of connections;

establishing a first path between the first device and the second device based on the first plurality of connections;

monitoring the plurality of connections, each of the plurality of connections carrying a corresponding one of a second plurality of packet groups;

determining a second amount of packets based on the each of the corresponding one of the second plurality of packet groups;

determining, based on the second amount of packets, a second plurality of connections between the first device and the second device, the second plurality of connections being among the plurality of connections; and establishing a second path between the first device and the second device based on the second plurality of connections, wherein at least one of the second plurality of packets includes a time stamp that indicates a time at which parameters associated with at least one of the plurality of connections are monitored, the parameters including a type of service, a flow identifier, an ingress port of the first device, an egress port of the first device, and a provisioned bandwidth.

8. The non-transient computer readable medium of claim 7, further comprising monitoring a latency of each of the plurality of connections.

* * * * *